(12) United States Patent
Wang et al.

(10) Patent No.: US 9,262,602 B2
(45) Date of Patent: Feb. 16, 2016

(54) EXTENSIBLE BIOS INTERFACE TO A PREBOOT AUTHENTICATION MODULE

(75) Inventors: Lan Wang, Houston, TX (US);
Valiuddin Y. Ali, Houston, TX (US);
Jennifer E. Rios, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1189 days.

(21) Appl. No.: 11/537,025

(22) Filed: Sep. 29, 2006

(65) Prior Publication Data

US 2008/0083019 A1 Apr. 3, 2008

(51) Int. Cl.
*G06F 21/31* (2013.01)
*G06F 21/57* (2013.01)

(52) U.S. Cl.
CPC .............. *G06F 21/31* (2013.01); *G06F 21/575* (2013.01)

(58) Field of Classification Search
CPC ......... G06F 21/45; G06F 21/30; H04L 63/08; H04L 9/3231
See application file for complete search history.

(56) References Cited

U.S. PATENT DOCUMENTS

| | | | |
|---|---|---|---|
| 7,117,376 B2 * | 10/2006 | Grawrock | 380/277 |
| 7,711,942 B2 | 5/2010 | Wang | |
| 2004/0221168 A1 | 11/2004 | Girard | |
| 2005/0228993 A1 * | 10/2005 | Silvester et al. | 713/168 |
| 2005/0289357 A1 | 12/2005 | Han | |
| 2006/0112420 A1 * | 5/2006 | Challener et al. | 726/5 |
| 2008/0052526 A1 * | 2/2008 | Dailey et al. | 713/186 |

FOREIGN PATENT DOCUMENTS

| | | |
|---|---|---|
| CN | 1526092 | 9/2004 |
| CN | 1667637 A | 9/2005 |
| WO | WO02/095571 | 11/2002 |
| WO | WO02095571 | 11/2002 |
| WO | WO2006/090091 | 8/2006 |
| WO | WO2006090091 | 8/2006 |

OTHER PUBLICATIONS

EP Official Action, dated Jul. 31, 2009, pp. 3.
English Translation of CN Office Action dated May 27, 2010, pp. 8.
CN Office Action, Appln No. 200780043727.6, date of mailing Nov. 30, 2011, 5 p.
Translation of CN Office Action, Appln No. 200780043727.6 date of mailing Nov. 30, 2011, 9 p.
European Patent Office, Communication pursuant to Article 94(3) EPC, Appln No. 07839099.4, dated Jul. 5, 2011 (6 pages).
European Patent Office, EP Appl. No. 07839099.4, Notification of Transmittal of the International Search Report and the Written Opinion of the International Searching Authority, or the Declaration dated Feb. 2, 2008 (12 pages).

(Continued)

*Primary Examiner* — Izunna Okeke
(74) *Attorney, Agent, or Firm* — Trop, Pruner & Hu, P.C.

(57) ABSTRACT

A computer-readable storage medium containing software that, when executed by a processor, causes the processor to implement a basic input/output system (BIOS). The BIOS comprises instructions that implement a BIOS core, instructions that implement a user authentication and enforcement engine (AEE), and instructions that implement an extensible interface to a preboot authentication module.

18 Claims, 3 Drawing Sheets

(56) References Cited

OTHER PUBLICATIONS

European Patent Office, Summons to Attend Oral Proceedings pursuant to Rule 115(1) EPC dated Mar. 5, 2015 (9 pages).

The International Bureau of WIPO, PCT Notification Concerning Transmittal of International Preliminary Report on Patentability(Chapter 1 of the Patent Cooperation Treaty) dated Apr. 9, 2009 (7 pages).

* cited by examiner

EXTENSIBLE BIOS INTERFACE TO A PREBOOT AUTHENTICATION MODULE

BACKGROUND

Some computers permit the computer to perform a process during boot by which the computer authenticates a user of the computer prior to completion of the boot process. Authenticating a user prior to completion of the boot process is referred to as "preboot authentication." Preboot authentication may be performed by the computer's basic input/output system (BIOS) code. Modifying the BIOS code to add new types of authentication mechanisms (e.g., retinal scan) unfortunately is time-consuming and expensive.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Figure 1:
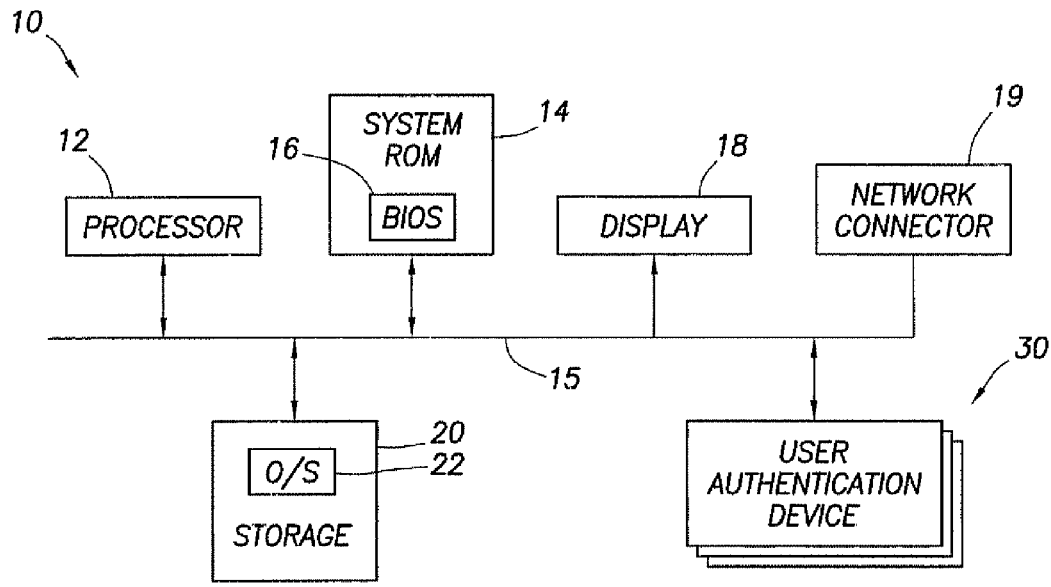
FIG. 1 shows a system in accordance with illustrative embodiments.

FIG. 1 shows a system 10 comprising a processor 12, a system read only memory (ROM) 14, a display 18, a network connection 19, storage 20 and one or more user authentication devices 30. The system 10 may comprise a computer (e.g., a notebook, a desktop, a server, etc.) or other type of computing system that implements user authentication.

The system ROM 14 contains a basic input/output system (BIOS) 16. The BIOS 16 comprises instructions that are executed by processor 12 and provide at least some, or all, of the functionality described herein in accordance with various embodiments. The BIOS 16 is stored on system ROM 14 in the embodiment of FIG. 1, but can be stored on any type of computer-readable medium whose software is executed by processor 12. The BIOS 16 causes the processor 12 to perform one or more low level functions of the system 10, such as providing a software interface to peripheral devices. The BIOS 16 also contains code that is executed to boot up, test, and otherwise initialize the system 10. In accordance with various embodiments, the BIOS 16 also provides for user authentication to require a user to be authenticated.

The storage device 20 comprises volatile or non-volatile storage such as random access memory (RAM), a hard disk drive, a compact disc read only memory (CD ROM) drive, a read only memory, Flash memory, etc. The storage 20 contains an operating system (OS) 22 executable by processor 12. In at least some embodiments, the OS 22 and/or OS-level code are also capable of performing user authentication.

The system 10 also comprises one or more user authentication devices 30, each of which can be used to authenticate a user of the system 10. Examples of the user authentication devices 30 comprise keyboards by which to enter a password, fingerprint scanners, retinal scanners, Trusted Platform Modules (TPMs), Universal Serial Bus (USB) token, a "virtual" token (i.e., a software emulation of hardware token), etc. In accordance with illustrative embodiments, the system 10 is capable of implementing "multifactor authentication" (MFA) by which multiple types of authentication are performed to authenticate a user. For example, an MFA policy may require the entry of a valid password and successful fingerprint scan. In illustrative embodiments, MFA is implemented by the BIOS 16 during the process of booting system 10.

As explained above, in some embodiments, the OS 22 is capable of authenticating a user. In other embodiments however, the BIOS 16 communicates with the OS 22 to cause the OS 22 to forego separately interacting with a user to perform user authentication. Instead, the OS 22 relies on the user authentication implemented in the BIOS 16. The system 10 is thus configurable to permit user authenticate to be performed under the control of the BIOS 16 or under the control of the OS 22. The authentication of a user at the BIOS-level and using that authentication process to authenticate the user at the OS-level is referred to as a "seam-less" authentication or a "single sign-on" process.

Figure 2:
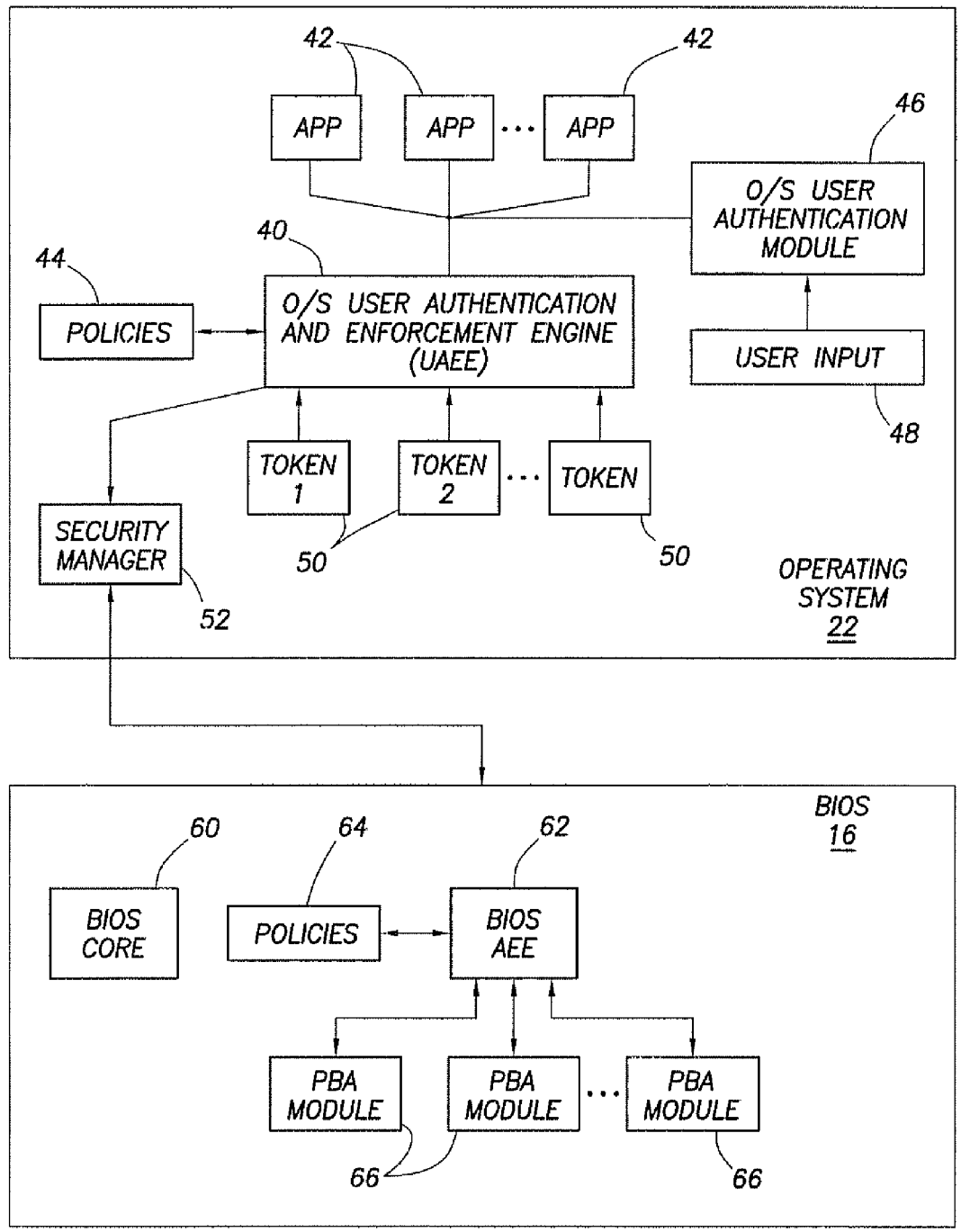
FIG. 2 shows a software architecture in accordance with illustrative embodiments.

FIG. 2 shows an illustrative embodiment of the software architecture of the system 10. The software architecture of FIG. 2 shows the OS 22 and the BIOS 16. The OS 22 comprises, or is otherwise associated with, an OS user authentication and enforcement engine (UAEE) 40, one or more authentication-base applications 42, policies 44, an OS user authentication module 46, various user authentication tokens 50 and a security manager 52. Each of the applications 42 requires a user to be authenticated, if authentication is enabled in that application, before the user can use the application. For example, an application 42 may comprise an Internet browser application with user authentication enabled.

The OS UAEE 40 manages the process of authenticating the user on behalf of the requesting application. Various authentication policies 44 are provided from which the OS UAEE 40 selects to authenticate the user. The policies may be user-dependent in some embodiments. That is, different users may have different authentication policies. For example, an authentication policy for one user may be to enter a particular password, while an authentication policy for another user may be to perform a fingerprint scan. Some, or all, authentication policies are performed by a user interacting with a user authentication device 30 (FIG. 1) and comparing information from that device with a corresponding token 50. For a fingerprint scan authentication, a token 50 comprises a fingerprint template previously stored in, for example, storage 20 for that user. That user is successfully authenticated if there is a sufficient match between the user's fingerprint (as detected by a fingerprint scanner) and the template (token 50). Other tokens 50 may comprise a password, a retinal scan template, etc.

Per the user authentication policies, in some embodiments the OS UAEE 40 determines whether the user has been authenticated. To that end, the OS UAEE 40 requests the OS user authentication module 46 to obtain the relevant user input (e.g., password entered via a keyboard, fingerprint scan, etc.). The OS user authentication module 46 passes the user-acquired input to the OS UAEE 40 which compares that input to the relevant token 50 to determine if a match exists. If a match exists, the user is considered authenticated. If a match does not exist, the user is not authenticated and access the application 42 may be denied.

The security manager 52 provides a secure interface to the BIOS 16. The policies 44 associated with the OS 22 are provided to the BIOS 16 via the security manager 52 and stored in the BIOS 16 as policies 64. The user authentication policies 64 and 44 are the same as each other in some embodiments, but can be different from each other in other embodiments.

Referring still to FIG. 2, the BIOS 16 comprises a BIOS core 60, a BIOS AEE 62, and one or more preboot authentication (PBA) modules 66. The BIOS core 60 comprises power on self-test (POST) code used to power and test various system functions and devices during a boot process. The BIOS core 60 also comprises low level code that provides a software interface to various peripheral devices (e.g., keyboards, displays, etc.).

The BIOS AEE 62 is executed to authenticate a user during the boot process in accordance with illustrative embodiments. Each PBA module 60 comprises code that enables the system 10 interact with a user authentication device 30. Each such user authentication device 30 may have its own code customized for operating that device 30. The BIOS AEE 62 calls the appropriate PBA module 66 to authenticate a user via a user authentication device 30 that corresponds to that PBA module 66.

The BIOS AEE 62 determines, or is informed as to, the user that is booting the system. This determination is made in at least some embodiments by registering each possible user with the BIOS 16. During a boot process, the BIOS core 60 or BIOS AEE 62 provides a list of possible users on display 18. A user of the system 10 selects one of the listed users (presumably himself or herself, but not necessarily). The BIOS core 62 informs the BIOS AEE 62 of the identity of the user, or the BIOS AEE 62 makes this determination independent of the BIOS core 60.

Figure 3:
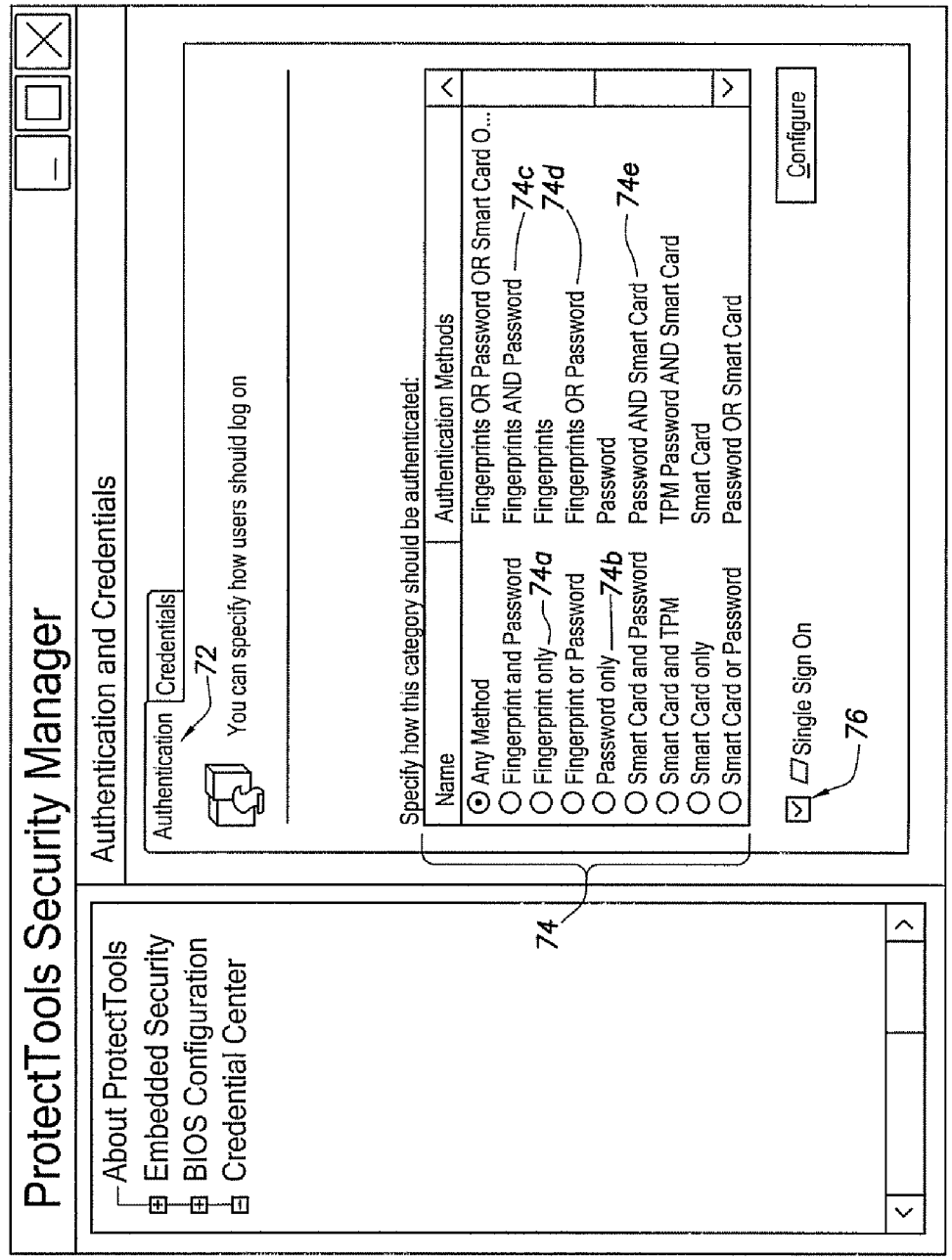
FIG. 3 shows a graphical user interface in accordance with illustrative embodiments.

FIG. 3 illustrates a graphical user interface (GUI) 70 implemented by the security manager 52. The GUI 70 of FIG. 3 comprises a selectable authentication tab 72. Upon selecting the authentication tab 72, a list 74 of authentication policy choices is provided to the user. Some of the choices 74 include choices that comprise a single authentication policy (e.g., fingerprint only choice 74a, password only choice 74b, etc.). Other choices 74 include MFA choices. Examples of MFA choices comprise the fingerprint and password choice 74c, the fingerprint or password choice 74d, and the password and Smart card choice 74e.

As explained above, a particular user has identified himself or herself to BIOS 16 during the boot process. Thus, upon selecting a choice from among choices 74 in GUI 74, a selectable authentication policy is established for that particular user. Different authentication policies can be similarly established for other users. The association of users to corresponding authentication policies is included as part of policies 44 at the OS 22 and policies 64 at the BIOS 16.

The GUI 70 also comprises a selectable feature 76 labeled in the embodiment of FIG. 3 as "single sign on." Selecting this feature causes the OS user authentication module 46 to rely on the BIOS 16 to perform user authentication and not separately authenticate a user with separately acquired user input. For example, if BIOS 16 authenticates a user by receiving and confirming a valid password, BIOS 16, in at least some embodiments, provides the password to the OS user authentication module 46. The OS user authentication module 46 may still perform user authentication in some embodiments, but does so with the password provided by the BIOS 16 and does not require the user to again enter the password. In other embodiments, the OS user authentication module 46 foregoes all attempts to authenticate a user.

Figure 4:
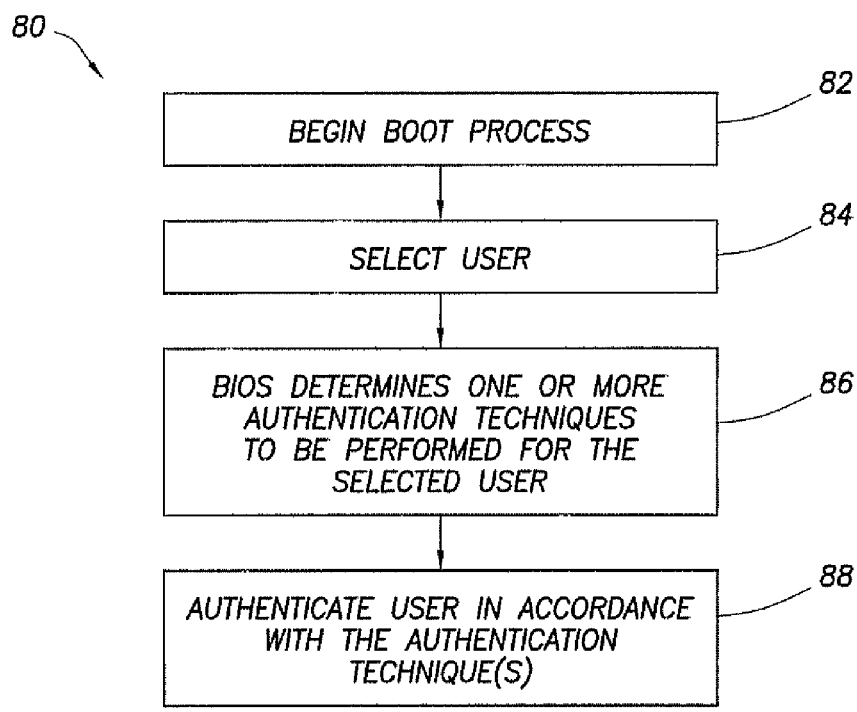
FIG. 4 shows a method in accordance with illustrative embodiments.

FIG. 4 illustrates a method 80 involving BIOS-level user authentication At 82, a user causes a boot process to begin. This action can be performed by powering on the system 10 or by the system receiving a remote boot signal from the network connection 19. At 84, a user is selected during the boot process, if multiple users registered to use the system. In some embodiments, the act of selecting a user comprises presenting the user with a list of user identifiers and the user selects one of the user identifiers (presumably, the identifier corresponding to that user). At 86, the BIOS 16 determines, based on the selected user, the one or more authentication techniques (e.g., password, fingerprint, etc.) to be performed for that particular user.

Referring still to FIG. 4, at 88, the one or more authentication techniques are performed in an attempt to authenticate the user. The BIOS AEE 62 performs the action of 88 in at least some embodiments. The BIOS AEE authenticates the user by interacting with the relevant PBA modules 66.

In accordance with illustrative embodiments, the interface between the BIOS AEE 62 and the PBA modules 66 is "standardized," i.e., that the basic structure of the interface is the same for all PBA modules 66. A standard interface means that the BIOS 16 can be readily extended to comprise additional PBA modules as support for additional user authentication devices 30 is desired. If an additional user authentication device 30 is desired to be used with system 10, the BIOS 16 is modified to comprise the PBA module 66 appropriate for the new user authentication device 30. The BIOS AEE 62, however, need not be modified because the manner in which the BIOS AEE 62 interacts with the new PBA module 66 is the same manner in which the BIOS AEE 62 already interacts with the existing PBA modules 66.

Any of a number of standard interfaces are possible for the interface between the BIOS AEE 62 and the PBA modules 66. In accordance with one embodiment, for example, the standard interface comprises a data set comprising a plurality of dataset elements that the BIOS AEE 62 generates to cause the relevant PBA modules 66 to execute. In some embodiments, a dataset is formed for each type of authentication technique included in the relevant policy. For example, if the authentication policy is to authenticate a password and a fingerprint scan, then a first dataset is generated for the password authentication and a second dataset is generated for the fingerprint scan authentication. Each such dataset is passed sequentially to the respective PBA module 66 and the PBA module 66 reports back a result in accordance with a standardized format.

At least some types of user authentication techniques comprise more than one authenticatable credential. For example, a given user may have several passwords. Each password represents an authenticatable credential By way of an additional example, a user may "register" his or her fingerprint from multiple fingers. Slight variations may be present in an imaged fingerprint from one finger versus another fingerprint and thus by registering all (erg., 10) fingers, the user's fingerprint scan can be authenticated without regard to which finger the user actually places on the fingerprint scanner.

The dataset elements comprise the following, in accordance with illustrative embodiments:

Dataset Element 1: number of user credentials identified by dataset element 2

Dataset Element 2: list of user credentials

Dataset Element 3: other parameters such as size of scratchpad memory allocated for the PBA module, the starting memory address of memory allocated for use by the PBA module, etc.

Each dataset element may contain the information listed or be a pointer to an address at which the relevant information is located.

The BIOS AEE 62 examines the policy associated with the given user from policies 64 and constructs the datasets accordingly. The BIOS AEE 62 provides the datasets to the corresponding PBA module 66. The PBA module 66 receives the datasets and begins to authenticate the user in accordance with the information identified by the datasets. For example, dataset element 1 may specify that either of two credentials can be authenticated for the particular user (e.g., either of two passwords). Dataset element 2 comprises the two credentials (e.g., the two passwords). The Dataset element 3 comprises whatever additional information the PBA module would need to perform its function.

The BIOS AEE 62 receives a result from each PBA module 66 as to whether a user has been authenticated via that particular PBA. The result provided from the PBA module 66 to the BIOS AEE 62 is also standardized. In accordance with at least one embodiment, the result comprises a return code that indicates whether the authentication was successful. If the authentication was successful, a return dataset is also provided. The return dataset comprises an identify of those credential(s) that matched during the user authentication process. For example, if the user was prompted to enter a password, the return dataset from the relevant PBA module 66 comprises the password that matched, assuming the password the user entered actually did match one of the credentials from dataset 2.

Standardizing the software interface between the BIOS AEE 62 and the PBA modules 66 facilitates additional PBA modules to be included with the BIOS 16. Any new PBA module 66 need function according to the standard dataset inputs and result outputs such as that discussed above. How a new PBA module 66 functions is largely irrelevant to the rest of the BIOS code. As long as the new PBA module is compatible with the standard interface implemented by the BIOS AEE 62, the remaining potions of the BIOS 16 (e.g., the BIOS core 60 and BIOS AEE 62) need not be changed.

Once the BIOS 16 authenticates the user, if the single sign on feature 76 (FIG. 3) was selected, information is provided by the BIOS 16 to the OS 22 by which the OS user authentication module 46 authenticates the user to the OS 22 without requiring input from the user. If the single sign on feature 76 has not been selected, then the OS 22 will attempt to authenticate the user in accordance with whatever polices have been set for that user in policies 44.

If, however, the single sign on feature 76 has been selected, then any of a variety of techniques can be performed to authenticate the user to the OS without requiring further input from the user. For example, one of the tokens 50 may be a valid password for the user. If the BIOS 16 reports a successful authentication of the user, the OS user authentication module 46 may retrieve the password token 50 and use that password rather than requiring the user to enter the password.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system comprising:
   a processor;
   a storage coupled to the processor and containing a basic input/output system (BIOS), the BIOS comprising a BIOS core, a user authentication and enforcement engine (AEE), and a plurality of preboot authentication modules associated with respective different types of user authentication devices, each of the plurality of preboot authentication modules comprising code to authenticate a user using a respective user authentication device of the different types of user authentication devices; and
   an extensible interface between the AEE and the plurality of preboot authentication modules,
   wherein the AEE is executable by the processor to:
      provide, over the extensible interface, a first dataset and a second dataset to respective first and second of the plurality of preboot authentication modules, the first dataset comprising first user credentials and a first number representing a quantity of the first user credentials, and the second dataset comprising second user credentials and a second number representing a quantity of the second user credentials, and
   wherein the first preboot authentication module is executable by the processor to use the first dataset to authenticate the user using a first user authentication device, and the second preboot authentication module is executable by the processor to use the second dataset to authenticate the user using a second user authentication device.

2. The system of claim 1, wherein the BIOS is executable by the processor to receive a result from a preboot authentication module of the plurality of preboot authentication modules regarding whether the user has been authenticated.

3. The system of claim 2, wherein the result indicates which of multiple types of authentication techniques was successful in authenticating the user.

4. The system of claim 2, further comprising an operating system including a user authentication module, and wherein the BIOS is executable by the processor to provide information to the user authentication module of the operating system indicating that the user was successfully authenticated via the BIOS.

5. The system of claim 1, wherein the AEE is executable by the processor to:
   select a policy of a plurality of policies;
   construct the first and second datasets based on the selected policy; and
   send the first dataset to the first preboot authentication module, and send the second dataset to the second preboot authentication module.

6. The system of claim 1, wherein the BIOS is updateable to include a new preboot authentication module to use with another user authentication device.

7. The system of claim 1, wherein the first user credentials are selected from among different passwords of the user, different fingerprints of the user, different retinal images of the user, and different tokens of the user.

8. The system of claim 1, wherein the extensible interface between the AEE and the plurality of preboot authentication modules is a standardized interface for the plurality of preboot authentication modules.

9. A method comprising:
executing, in a system comprising a processor, a basic input/output system (BIOS) including a BIOS core, a user authentication and enforcement engine (AEE), and a plurality of preboot authentication modules associated with respective different types of user authentication devices, each of the plurality of preboot authentication modules comprising code to authenticate a user using a respective user authentication device of the different types of user authentication devices;
providing, by the AEE over an extensible interface between the AEE and the plurality of preboot authentication modules, a first dataset and a second dataset to respective first and second of the plurality preboot authentication modules, the first dataset comprising first user credentials and a first number representing a quantity of the first user credentials, and the second dataset comprising second user credentials and a second representing a quantity of the second user credentials;
using, by the first preboot authentication module, the first dataset to authenticate the user using a first of the different types of user authentication devices; and
using, by the second preboot authentication module, the second dataset to authenticate the user using a second of the different types of user authentication devices.

10. The method of claim 9, further comprising informing an operating system authentication module of results of the authenticating by the first and second preboot authentication modules.

11. The method of claim 9, further comprising updating the BIOS to include a new preboot authentication module to use with another user authentication device.

12. The method of claim 9, wherein the authenticating of the user by the first preboot authentication module comprises verifying that a quantity of the first user credentials is equal to the first number.

13. The method of claim 9, further comprising:
selecting, by the AEE, a policy of a plurality of policies;
constructing, by the AEE, the first and second datasets based on the selected policy; and
sending, by the AEE, the first dataset to the first preboot authentication module, and the second dataset to the second preboot authentication module.

14. The method of claim 11, wherein the updating of the BIOS to include the new preboot authentication module is performed without modifying the BIOS core.

15. The method of claim 9, wherein the first user credentials are selected from among different passwords of the user, different fingerprints of the user, different retinal images of the user, and different tokens of the user.

16. The method of claim 9, wherein the extensible interface between the AEE and the plurality of preboot authentication modules is a standardized interface for the plurality of preboot authentication modules.

17. A non-transitory computer-readable storage medium storing instructions that upon execution cause a system to:
execute a basic input/output system (BIOS) including a BIOS core, a user authentication and enforcement engine (AEE), and a plurality of preboot authentication modules associated with respective different types of user authentication devices, each of the plurality of preboot authentication modules comprising code to authenticate a user using a respective user authentication device of the different types of user authentication devices;
cause the AEE to provide, over an extensible interface between the AEE and the plurality of preboot authentication modules, a first dataset and a second dataset to respective first and second of the plurality preboot authentication modules, the first dataset comprising first user credentials and a first number representing a quantity of the first user credentials, and the second dataset comprising second user credentials and a second representing a quantity of the second user credentials;
cause the first preboot authentication module to use the first dataset to authenticate the user using a first of the different types of user authentication devices; and
cause the second preboot authentication module to use the second dataset to authenticate the user using a second of the different types of user authentication devices.

18. The non-transitory computer-readable storage medium of claim 17, wherein the instructions upon execution cause the system to further update the BIOS to include a new preboot authentication module to use with another user authentication device.

* * * * *